US012293003B2

(12) United States Patent
Gupta et al.

(10) Patent No.: US 12,293,003 B2
(45) Date of Patent: *May 6, 2025

(54) MACHINE LEARNING MODELING TO IDENTIFY SENSITIVE DATA

(71) Applicant: Citibank, N.A., New York, NY (US)

(72) Inventors: Shubhanshu Gupta, Singapore (SG);
Ashish Awasthi, Singapore (SG);
Amaruvi Devanathan, Chennai (IN);
Mallapu Raghavulu Surya Prakash, Singapore (SG)

(73) Assignee: CITIBANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,684

(22) Filed: May 3, 2024

(65) Prior Publication Data
US 2024/0289492 A1    Aug. 29, 2024

Related U.S. Application Data

(63) Continuation of application No. 17/476,388, filed on Sep. 15, 2021, now Pat. No. 11,977,660.

(51) Int. Cl.
G06F 21/62     (2013.01)
G06F 16/22     (2019.01)
G06F 16/334    (2025.01)
G06F 16/335    (2019.01)

(52) U.S. Cl.
CPC ........ G06F 21/6254 (2013.01); G06F 16/221 (2019.01); G06F 16/3347 (2019.01); G06F 16/335 (2019.01)

(58) Field of Classification Search
None
See application file for complete search history.

(56) References Cited

U.S. PATENT DOCUMENTS

| | | | | |
|---|---|---|---|---|
| 11,630,853 | B2* | 4/2023 | Hawco | G06F 21/6254 |
| | | | | 707/739 |
| 11,755,766 | B2* | 9/2023 | Kulkarni | G06F 21/6227 |
| | | | | 726/26 |
| 2018/0165475 | A1* | 6/2018 | Veeramachaneni | |
| | | | | G06F 21/6254 |
| 2018/0285599 | A1* | 10/2018 | Praveen | G06F 18/22 |

(Continued)

Primary Examiner — Joseph P Hirl
Assistant Examiner — Hassan Saadoun
(74) Attorney, Agent, or Firm — Foley & Lardner LLP

(57) ABSTRACT

Methods and systems herein identify and redact personally identifiable information. A PII sensitivity detection framework includes multiple layers where each layer corresponds to a computer model. The framework analyzes data stored within different data tables and predicts whether a data column includes PII. The first layer corresponds to an artificial intelligence model that analyzes each column metadata and predicts a first score indicative of a likelihood of PII. The second layer corresponds to a rule-based computer model that uses various rules to determine a second score indicative of a likelihood of PII for each column. The third layer corresponds to a column content model that analyzes content of each column using various natural language processing techniques to generate a third score indicative of a likelihood of PII. The framework masks data being presented to a user based on the scores generated via execution of one or more of the layers.

20 Claims, 16 Drawing Sheets

(56) References Cited

U.S. PATENT DOCUMENTS

| | | | |
|---|---|---|---|
| 2021/0067542 A1* | 3/2021 | Linder | H04L 63/1433 |
| 2021/0073412 A1* | 3/2021 | Kvochko | G06T 1/0021 |
| 2021/0125089 A1* | 4/2021 | Nickl | H04W 12/02 |
| 2022/0043935 A1* | 2/2022 | Brannon | G06F 16/335 |
| 2022/0198044 A1* | 6/2022 | Madhavan | G06Q 50/265 |

* cited by examiner

```
                                    200
```

Retrieve an identifier and metadata associated with at least one column within a data table stored in a database, the identifier corresponding to a column name and the metadata corresponding to column data. 210

Execute, using a vector comprising a numerical representation of the metadata, a first artificial intelligence model to generate a first score corresponding a first likelihood of the column including personally identifiable information. 220

Execute a second artificial intelligence model to generate a second score corresponding to a second likelihood of the column including personally identifiable information, the second artificial intelligence model determining the second score based on a cardinality value or a length value of the identifier. 230

Generate a third score based on the first and the second scores. 240

In response to determining that the third score indicates that the column includes personally identifiable information, mask the column data. 250

FIG. 2

| TABLENAME | COLUMN NAME | probability_of_pii |
|---|---|---|
| DRI_356_ECMS_EPADC_W | v name | 100% |
| DRI_ALPS_LOAN_APP_SNAP_D | adhar dob match txt | 100% |
| SPR_CLNT_ACCT_LINK_SNAPSHOT_M | clnt mail addr city nm txt | 100% |
| SPR_CLNT_ACCT_LINK_SNAPSHOT_D | clnt legal addr city nm txt | 100% |
| DRI_BKG_MF_TXN_CHD_PR_SNAP_D | pan txt | 100% |
| FACT_APPLICATION_MASTER_D | city name | 100% |
| DRI_CBOL_MBOL_USR_DEV_FUN_SNAP_D | ip addr txt | 100% |
| DRI_ALPS_LOAN_ADDR_SNAP_D | addr cde | 99% |
| DRI_Resi_HST_CASH_PROC_SNAP_D | pan nbr | 99% |
| INT_MERCHANT_MASTER | payee name | 99% |
| DRI_BKG_ACCT_CLSR_SNAP_M | v payee name | 99% |
| DRI_BKG_CBOLMBOL_ACC_OPN_MKR_SNAP_D | pan dt txt | 99% |
| DRI_HOME_MN_BRWR_ADDR_SNAP_M | add add dt | 99% |
| ETL_EAP_CLNT_CRD_ACCT_DTL_D | crd hldr mob phne nbr | 99% |
| DRI_BKG_CBOLMBOL_ACC_OPN_MKR_SNAP_D | spouse frst nm txt | 99% |
| DRI_ABF_ABFGCIB_CUST_ST_SNAP_D | cust pan nbr | 99% |
| DRI_BKG_CBOLMBOL_ACC_OPN_MKR_SNAP_D | spouse mid nm txt | 99% |
| DRI_BKG_MF_BTC_TXN_SNAP_D | pan hldr txt | 99% |

| TABLENAME | ORIGINAL COLUMN NAME | SHORT DESC | probability_of_pii | Cardinality % |
|---|---|---|---|---|
| int_client_card_master | crd_old_crd_nbr | card old card number | 78% | 100.00 |
| int_cbol_user_sess_master | cint_crd_nbr | client card number | 75% | 100.00 |
| int_crm_offer_comm_dtl | delv_msg_txt | delivery message text | 87% | 97.16 |
| int_appcnt_phone_master | phne_nbr | telephone number | 91% | 89.80 |
| int_merch_setl_dtl_master | pymt_trnsfr_txt | payment transfer text | 90% | 78.89 |

FIG. 10

| TABLENAME | ORIGINAL COLUMN NAME | SHORT DESC | probability_of_pii | Min Character Length | Max Character Length |
|---|---|---|---|---|---|
| int_ecr_rmrk_appln_master | birth_city_cde | birth city code | 73% | 1 | 1 |
| int_ecr_rmrk_appln_master | ntnlty_desc | nationality description | 71% | 2 | 2 |
| int_ecr_rmrk_appln_master | exp_chq_depst_val_range | exp cheque deposit val | 69% | 2 | 2 |
| int_acq_sau_offers_txn_d | addl_info_txt | additional information | 83% | 2 | 2 |
| int_inv_prd_mstr_dtl | scurty_remrk_txt | security remarks text | 86% | 1 | 1 |

| TABLENAME | ORIGINAL COLUMN NAME | SHORT DESC | probability_of_pii | Min Character Length | Max Character Length |
|---|---|---|---|---|---|
| int_ecr_rmrk_appln_master | birth_city_cde | birth city code | 73% | 3 | 3 |
| int_auth_txn_d | crd_sup_seq_nbr | card supplementary sequence number | 78% | 3 | 3 |
| int_acq_mgt_prd_master | crd_nbr_txt | card number | 35% | | |
| int_cbd_prelogn_pymt_instr_d | rewards_dtl_txt | rewards detail text | 70% | 3 | 21 |
| int_merch_setl_dtl_master | pymt_trnsfr_txt | payment transfer text | 90% | 2 | 25 |

FIG. 11

| TABLENAME | ORIGINAL COLUMN NAME | SHORT DESC | probability_of_pii | # of values matched with PII values |
|---|---|---|---|---|
| int_crm_contact_history | crt_user_nm_txt | crt user name text | 55% | 33 |
| int_client_empl_reln_maste | emplr_state_txt | employer province tex | 98% | 3 |

FIG. 12

| TABLENAME | ORIGINAL COLUMN NAME | SHORT DESC | probability_of_pii | Value Tags |
|---|---|---|---|---|
| int_client_card_master | crd_old_crd_nbr | card old card number | 78% | integer,credit_cards |
| int_crm_offer_comm_dtl | delv_msg_txt | delivery message text | 87% | dates,times,links,emails,prices,people_name,country_name,city_name |
| int_client_empl_reln_master | emplr_state_txt | employer province text | 98% | string,city_name |
| int_merch_setl_dtl_master | pymt_trnsfr_txt | payment transfer text | 90% | integer,street_addresses,short_address_1,short_address_2,string,people_name,city_name |

FIG. 15

MACHINE LEARNING MODELING TO IDENTIFY SENSITIVE DATA

CROSS-REFERENCE TO RELATED APPLICATIONS

This application is a continuation application of U.S. application Ser. No. 17/476,388, filed Sep. 15, 2021, which is incorporated by reference herein in its entirety for all purposes.

TECHNICAL FIELD

This application relates generally to analyzing data and dynamically revising graphical user interfaces.

BACKGROUND

Customers' Personally Identifiable Information (PII) refers to sensitive data assets that must be protected. Compromised PII can result in identity theft or theft of financial data, which is highly undesirable and can lead to regulatory scrutiny. Currently, the process of identifying PII is manual (e.g., review by a human expert). This process is undesirable because it is prone to errors and misclassifications due to the reviewer's subjective skills and understanding. Manual reviews are also undesirable because they are not scalable.

In order to improve manual review methods, some conventional software solutions offer forms of PII detection, redaction, or masking services. However, conventional software solutions have faced technical shortcomings. These conventional software solutions focus their PII detection on analyzing text and determining whether the content of the text being presented includes any PII. Conventional software solutions do not identify the presence of PII at its root (e.g., at a database level). Conventional solutions fail to provide efficient identification of PII because data is represented differently at the database level than when it is represented viewed by users (e.g., data may have abbreviations, and present no contextual information at the database level). Furthermore, some conventional PII detection software solutions are solely rule-based. These predefined rules must be defined by users or system administrators, which is an undesirable process as it does not capture all instances of PII when a database has hundreds of data columns.

SUMMARY

For the aforementioned reasons, there is a desire for an electronic system to identify PII at a database level and customize the presentation of the identified PII, such that PII is not presented inappropriately. Described herein are method and systems for automated PII sensitivity detection for data tables, data columns, and their metadata within a database. The methods and systems described herein provide a PII sensitivity detection framework having multiple layers for preventing a potential breach of PII.

The first layer builds a machine learning model, which learns the level of PII sensitivity from the patterns and diversity of the column name and metadata (e.g., column description, data type, suffix, and prefix). A second layer may utilize a rule-based pattern-matching algorithm that finds matches of existing and available PII data with the new or unknown/unclassified column data, to determine the latter's PII sensitivity. A third layer may analyze the data that resides within the columns utilizing an amalgam of natural language processing and pattern-matching algorithms. The algorithms learn what PII is and its characteristics. The algorithms, based on their learnings, analyze the data to identify similar patterns in the data. This multi-layered process helps identify misclassified PII data column(s) or assign the PII/No-PII sensitivity to a new column.

The disclosed PII sensitivity detection framework can be adapted, such that the models described herein are sensitive to or trained based on a particular language or customized for a particular organization (e.g., adapts to rules and regulations that define PII). For instance, the models may be trained, such that they identify PII in German or French. The disclosed PII sensitivity detection framework prevents unintended data exposure and manages compliance and regulatory risk. Using the methods and systems discussed herein, the PII sensitivity detection framework analyzes text and other metadata from data tables (e.g., columns) and their content to generate a probability of the presence of PII in particular column of a data table.

In an embodiment, a method comprises retrieving, by a processor, an identifier and metadata associated with at least one column within a data table stored in a database, the identifier corresponding to a column name and the metadata corresponding to column data; executing, by a processor using a vector comprising a numerical representation of the metadata, a first artificial intelligence model to generate a first score corresponding a first likelihood of the column including personally identifiable information; executing, by the processor, a second artificial intelligence model to generate a second score corresponding to a second likelihood of the column including personally identifiable information, the second artificial intelligence model determining the second score based on a cardinality value or a length value of the identifier; generating, by the processor, a third score based on the first and the second score; and in response to determining that the third score indicates that the column includes personally identifiable information, masking, by the processor, the column data.

In another embodiment, a system comprises a server comprising a processor and a non-transitory computer-readable medium containing instructions that when executed by the processor causes the processor to perform operations comprising: retrieve an identifier and metadata associated with at least one column within a data table stored in a database, the identifier corresponding to a column name and the metadata corresponding to column data; execute, using a vector comprising a numerical representation of the metadata, a first artificial intelligence model to generate a first score corresponding a first likelihood of the column including personally identifiable information; execute a second artificial intelligence model to generate a second score corresponding to a second likelihood of the column including personally identifiable information, the second artificial intelligence model determining the second score based on a cardinality value or a length value of the identifier; generate a third score based on the first and the second score; and in response to determining that the third score indicates that the column includes personally identifiable information, mask the column data.

It is to be understood that both the foregoing general description and the following detailed description are exemplary and explanatory, and are intended to provide further explanation of the invention as claimed.

BRIEF DESCRIPTION OF THE DRAWINGS

The accompanying drawings constitute a part of this specification, illustrate an embodiment of the invention, and, together with the specification, explain the invention.

FIGS. 2-5 illustrate flowcharts depicting operational steps for a PII sensitivity detection framework, in accordance with an embodiment.

FIGS. 6-7 illustrate data analyzed by a PII sensitivity detection framework, in accordance with an embodiment.

FIGS. 10-12 illustrate data analyzed by a PII sensitivity detection framework, in accordance with an embodiment.

FIG. 15 illustrates data analyzed by a PII sensitivity detection framework, in accordance with an embodiment.

DETAILED DESCRIPTION

Figure 1:
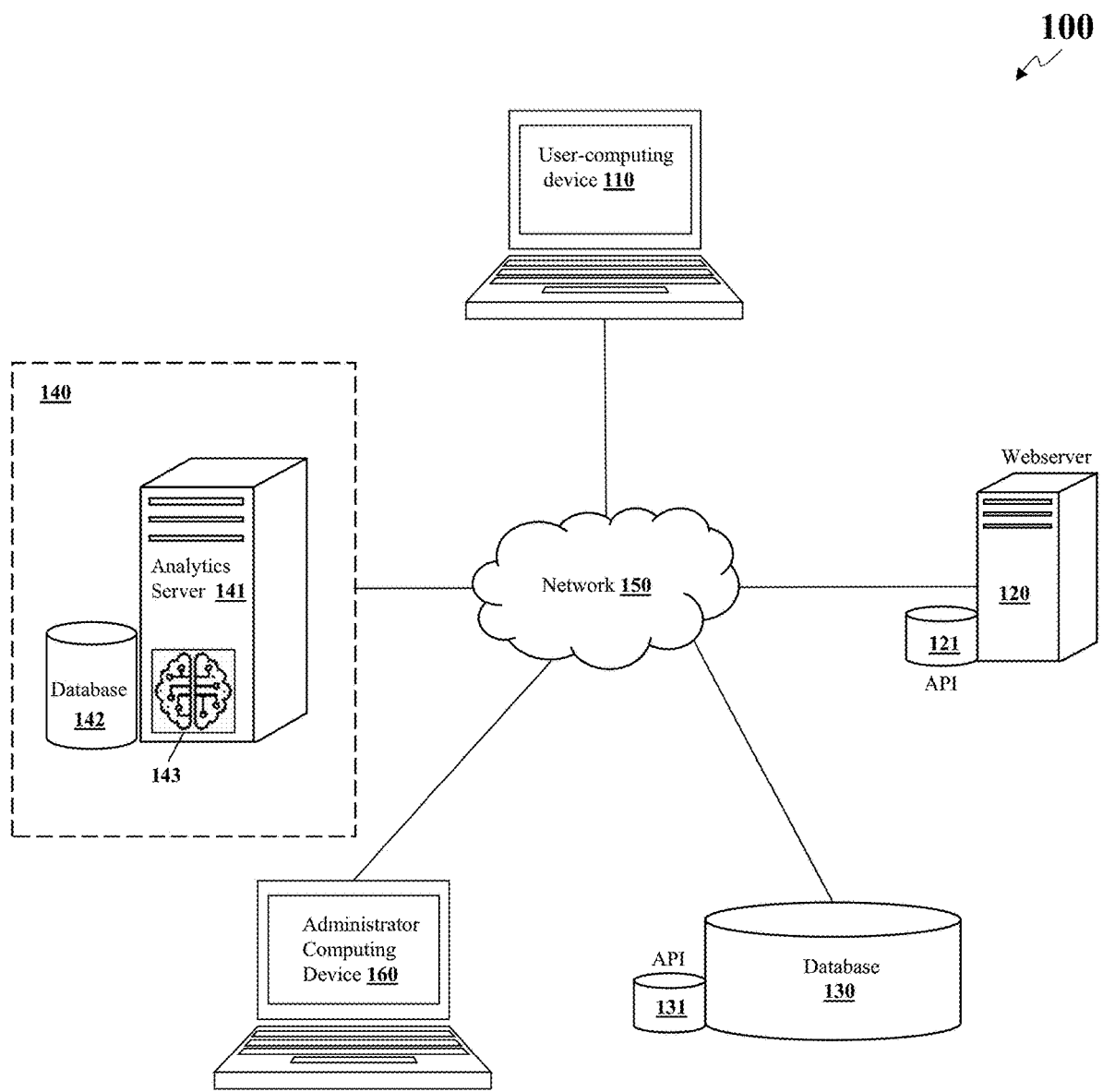
FIG. 1 illustrates a computer system for a PII sensitivity detection framework, in accordance with an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 illustrates various components of a system 100 for a PII sensitivity detection framework, in accordance with an embodiment. The system 100 provides a non-limiting example of a computer system having various features that can be utilized to analyze data, identify PII, and revise the presentation of the identified PII.

The system 100 may include an analytics server 141 and a database 142 (collectively PII detection system 140), webserver 120, database 130, user-computing device 110, and administrator computing device 160. These features may communicate with each other over a network 150. The network 150 may include, but is not limited to, private or public local area networks, wireless local area networks, metropolitan area networks, wide-area networks, and the Internet. The network 150 may further include both wired and wireless communications according to one or more standards via one or more transport mediums. Communication over the network 150 is in accordance with various communication protocols such as transmission control protocol and internet protocol, user datagram protocol, and Institute of Electrical and Electronics Engineers communication protocols. The network 150 may further include wireless communications according to Bluetooth specification sets, or another standard or proprietary wireless communication protocol. The network 150 may further include communications over a cellular network, including, for example, a global system for mobile communications, code division multiple access, and enhanced data for global evolution network.

The system 100 may operate in a local computing environment where the user-computing device 110 executes an application to access an electronic platform generated/hosted by the webserver 120. An example of an electronic platform may be a website accessible through a browser application. For instance, the user-computing device 110 may execute a browser application and access a website hosted by the webserver 120. Even though some embodiments described herein focus on a website hosted by the webserver 120, the methods and systems described herein are not limited to websites. For instance, the webserver 120 may also host/generate an application accessible by the user-computing device 110 (e.g., internal application native to an organization where an employee operating the user-computing device 110 may access a mobile application accessed by the user-computing device 110). The analytics server 141 may identify PII to be presented on the user-computing device 110.

The system 100 may operate in a cloud-computing environment where the user-computing device 110 may be cloud-optimized. The user-computing device 110 may execute the browser application and access data where the PII within the data is identified and/or masked by the analytics server 141. In the cloud-computing environment, a web browser executing on the user-computing device 110 may interface with an application program associated with the analytics server 141, which is executed remotely via cloud-based technology.

The analytics server 141 may be any computing device capable of performing the actions described herein. For instance, the analytics server 141 may include a processing unit, and a non-transitory machine-readable storage medium. The processing unit may include a processor with a computer-readable medium, such as random access memory coupled to the processor. The analytics server 141 may be executing algorithms or computer-executable program instructions, which may be executed by a single processor or multiple processors in a distributed configuration. The analytics server 141 may be configured to interact with one or more software modules of a same or a different type operating within the system 100.

Non-limiting examples of the processor may include a microprocessor, an application-specific integrated circuit, or a field-programmable object array, among others. The analytics server 141 is capable of executing data-processing tasks, data—analysis tasks, and valuation tasks. Non-limiting examples of the analytics server 141 may include a desktop computer, a server computer, a laptop computer, a tablet computer, or the like. For case of explanation, the FIG. 1 depicts a single server computing device functioning as the analytics server 141. However, some embodiments may include a plurality of server computing devices capable of performing various tasks described herein.

The analytics server 141 may utilize a database, such as the database 142, to store and/or retrieve various data described herein. For instance, the analytics server 141 may store data corresponding to different user attributes within the database 142. Each user attribute may correspond to an access authorization level indicating a data sensitivity level accessible by the user. For instance, a user may only have a level 1 access prohibiting them from viewing PII. The analytics server 141 may then use the user attributes to regulate whether the user can access certain PII.

The analytics server 141 and the database 142 may represent a PII detection system 140. The PII detection system 140 may offer dynamic revision of electronic content (e.g., webpages) for the webserver 120. In a non-limiting example, the webserver 120 may generate/host a website for a bank that is viewed by various employees. The analytics server 141 may utilize the methods and systems described herein to revise the webpage and display customized information accordingly by masking data based on the viewer's authorization level.

The analytics server 141 may use various application programming interfaces (APIs) to communicate with different features described herein. An API, as used herein, refers to a computing interface that uses connector programming code to act as a software intermediary between at least two computing components/features described herein. The API may automatically and/or periodically transfer various calls, instructions, and/or requests among different features of the system 100. Using different APIs, the analytics server 141 may automatically transmit and/or receive calls and instruction. For instance, the analytics server 141 may use the API 121 to communicate with the webserver 120, such that when a user operating the user-computing device 110 requests to view data, the API 121 automatically transmits a notification to the analytics server 141. The notification may include data needed for the analytics server 141 to identify whether the requested data includes PII and whether the user operating the user-computing device 110 has proper authorization to view the data. The analytics server 141 may also use the API 131 to communicate with the database 130.

The API 131 and/or 121 may be two-way APIs. A two-way API refers to an API that allows information to be transmitted back and forth between at least two features of the system 100. For instance, when a user operating the user-computing device 110 requests to view data via a website hosted by the webserver 120, the API 121 may generate a call instructing the analytics server 141 to analyze the data and mask the PII (if any).

The analytics server 141 may also use the API 121 to transmit a second call to the webserver 120. The second call may include instructions to mask the PII (e.g., software code defining the graphical elements needed to mask the PII, such as redaction) and for the webserver 120 to embed the graphical elements within one or more webpages. The analytics server 141 may similarly use a two-way API to communicate with the database 130.

Additionally or alternatively, the analytics server 141 may use a content delivery network (CDN) to ensure data integrity when communicating with different features described in the system 100. A CDN, as described herein, refers to a distributed delivery network of proxy servers/nodes that uses multi-layered delivery methods/systems to transmit data (e.g., Akamai). The analytics server 141 may use a CDN when communicating various calls/instructions to the webserver 120 (directly or via the API 121) and/or the database 130 (directly or via the API 131).

The webserver 120 may be a computing device hosting a website (or any other electronic platform) accessible to the user-computing device 110 via the network 150. The webserver 120 may include a processing unit and non-transitory machine-readable storage capable of executing various tasks described herein. The processing unit may include a processor with a computer-readable medium, such as a random access memory coupled to the processor. Non-limiting examples of the processor may include a microprocessor, an application specific integrated circuit, or a field programmable object array, among others. Non-limiting examples of the webserver 120 may include workstation computers, laptop computers, server computers, or the like. While the system 100 includes a single webserver 120, in some embodiments, the webserver 120 may include a number of computing devices operating in a distributed computing environment.

The webserver 120 may be executing algorithms or computer executable program instructions, which may be executed by a single processor or multiple processors in a distributed configuration. The webserver 120 may be configured to interact with one or more software modules of a same or a different type operating within the system 100. For instance, the webserver 120 may execute software applications configured to host an electronic platform, which may generate and serve various webpages to the user-computing device 110. The electronic platform may also embed various graphical user interfaces generated by the analytics server 141.

The webserver 120 may execute software applications configured to display the user interfaces described herein (e.g., host a website that displays graphical user interfaces and other graphical elements generated by the analytics server 141), which may generate and serve various webpages to the user-computing device 110. Even though the analytics server 141 and the webserver 120 are depicted as separate features, in some configurations, functionality of these features is performed by a single server. For instance, the analytics server 141 may act as the webserver 120 by hosting the electronic content on the platform, identifying PII, and masking PII.

The analytics server 141 and/or the webserver 120 may be configured to require user authentication based upon a set of user authorization credentials (e.g., usernames, passwords, biometrics, cryptographic certificates, and the like). In such implementations, the analytics server 141 and/or the webserver 120 may access a system database (e.g., database 130) configured to store user credentials, which the analytics server 141 and/or the webserver 120 may be configured to reference in order to determine whether a set of entered credentials (purportedly authenticating the user) match an appropriate set of credentials that identify and authenticate the user.

The analytics server 141 and/or the webserver 120 may generate and host webpages onto the user-computing device 110 based upon a user's role within the system 100. Using the authorization credentials, the analytics server 141 and/or the webserver 120 may access a user profile and determine whether the user is authorized to access PII stored in the database 130. In such implementations, the user's role may be defined by data fields and input fields in user records stored in the database 130. The analytics server 141 and/or the webserver 120 may authenticate the user and may identify the user's role by executing an access directory protocol (e.g., Lightweight Directory Access Protocol (LDAP)). As a result, the electronic content displayed on the user-computing device 110 may be customized for each user.

The user-computing device 110 may be any computing device that includes a processing unit. The processing unit may execute a web browser application that accesses or receives data records from the database 130 via the analytics server 141 and/or the webserver 120. The processing unit may include a processor with computer-readable medium, such as random access memory coupled to the processor. The user-computing device 110 may be running algorithms or computer executable program instructions, which may be executed by a single processor or multiple processors in a distributed configuration.

Non-limiting examples of the processor may include a microprocessor, an application specific integrated circuit, or a field programmable object array, among others. Non-limiting examples of the user-computing device 110 may include a server computer, a workstation computer, a tablet device, or a mobile device (e.g., smartphone). An end-user (requesting to view data that may include PII) may operate the user-computing device 110. For case of explanation, FIG. 1 illustrates a single computing device functioning as the user-computing device 110. However, some embodiments may include a plurality of computing devices capable of performing the tasks described herein.

The database 130 associated with the analytics server 141, the webserver 120, and the user-computing device 110 is capable of storing information in various formats and/or using encryption methods. The information may include data records associated with various organizations utilizing the webserver 120, data records associated with the webserver 120, and data records associated with various users (e.g., customer profiles having PII, such as financial information). The database 130 may also store data associated with user preferences, attributes associated with various graphical elements to be generated by the analytics server 141, and the like. The database 130 may have a logical construct of data files, which are stored in non-transitory machine-readable storage media, such as a hard disk or memory, controlled by software modules of a database program (e.g., SQL), and a database management system that executes the code modules (e.g., SQL scripts) for various data queries and management functions. Even though the database 130 is shown as a separate computing feature, the database 130 may be a part of a computing environment that includes the webserver 120 and/or the analytics server 141.

In operation, the user-computing device 110 may utilize a web browser to generate a request to view data stored within the database 130. As a result, the webserver 120 may use the API 121 to instruct the analytics server 141 to identify whether the requested data includes any PII, and if so, to mask the PII. The instruction may also include data associated with the user (e.g., a user identifier used to determine the user's access authorization level) and data associated with the user's request (e.g., the identifier of the data to be presented).

The analytics server 141 may execute various artificial intelligence (AI) models 143 to analyze the data stored within the database 130. As will be described below, the AI models 143 may identify PII at its root level (e.g., columns that include PII) instead of analyzing the data presented on the user-computing device 110. When the analytics server 141 determines a column within one or more data tables stored in the database 130 includes PII, the analytics server 141 may change a data record within the database 130 that designates the column as including PII. The analytics server 141 may also instruct the webserver 120 to revise the graphical user interfaces displaying the requested data by masking the PII.

In a non-limiting example, the analytics server 141 may provide a pluggable software component to be installed and executed by a host utilizing the webserver 120 to host a website. Upon installation, a system administrator may configure the pluggable component using various preferences and defined criteria. For instance, the system administrator may customize the pluggable component, by inputting access rights for different users or providing masking preferences (e.g., visual attributes of redactions of PII when presenting electronic content).

A pluggable component (also known as a "plug-in") may be a software component that adds a specific feature to an existing computer program utilized and executed by the webserver 120. The analytics server 141 may provide services discussed herein via the pluggable component. The analytics server 141 may implement plug-in functionality using shared libraries that are dynamically loaded at run time and installed in a place prescribed by the host application (e.g., stored within the database 142 and/or database 130). The pluggable component may be in direct communication with the analytics server 141, such that the analytics server 141 can determine whether the user/customer has requested to view any data that is (or should be) designated as PII. The analytics server 141 can also mask the PII by either directly displaying a graphical element that conceals and redacts the PII and/or instructing the webserver 120 to mask the identified PII.

The system 100 may be utilized by a third-party webserver (e.g., webserver 120) to identify PII and revise one or more graphical elements representing the PII. For instance, the webserver 120 may use the analytics server 141 to identify and mask PII stored within a database, such as the database 130. In some configurations, the graphical elements generated by the analytics server 141 may be incorporated into one or more webpages hosted by the webserver 120. In other configurations, the graphical elements generated by the analytics server 141 may be directly displayed onto the end-users' computing devices (e.g., user-computing device 110).

FIG. 2 illustrates a flowchart depicting operational steps for a PII sensitivity detection framework, in accordance with an embodiment. The method 200 describes how a server, such as the analytics server 141 described in FIG. 1, identifies and masks PII. Even though the method 200 is described as being executed by the analytics server, the method 200 can be executed by any server, and/or locally within a user's computing device, or as a browser extension. Additionally or alternatively, the method 200 can be executed by a webserver acting as both a webserver and an analytics server by hosting the website, identifying, and/or masking PII. Furthermore, other configurations of the method 200 may comprise additional or alternative steps, or may omit one or more steps altogether.

At step 210, the analytics server may retrieve an identifier and metadata associated with at least one column within a data table stored in a database, the identifier corresponding to a column name and the metadata corresponding to column data.

As used herein, a data table is a data structure used to organize data within a database. For instance, a data table may be an organized grouping of data fields. Data tables may store relatively static data or may be frequently updated. A data table may organize the information about a single (or multiple) data topic into rows and columns. For example, a database for an organization would typically contain a data table for customer information that would store customers' account numbers, addresses, phone numbers, and the like, in a series of columns. Each piece of data (e.g., account number) may be a field in the data table. A column within the data table may consist of all the entries in a single field, such as the telephone numbers of all the customers. Fields, in turn, are organized as records, which are complete sets of information (such as the set of information about a particular customer), each of which comprises a row.

The analytics server may retrieve information associated with one or more data tables within a database. The data retrieved may be associated with the data table itself. The data organized within different data tables may be retrieved separately. For instance, the data retrieved may indicate a number of data tables within the database, the name of each data table, the type of data stored within each data table, and the like. The analytics server may also retrieve additional data that is specific to each data table. For instance, for each data table, the analytics server may determine a number of columns and rows, the original name of each column, a short name for each column, the description, a short description, the type of data stored within each column (e.g., alphanumerical or integer), the classification of data stored (e.g., name, address, social security number, or account name), the number of characters stored within each row, prefixes, suffixes, or the like. The data retrieved may be stored (or may have been previously stored) in the form of metadata associated with the data table and/or each column.

The analytics server may perform the step 210 periodically or upon a triggering criterion. In one non-limiting example, the analytics server may retrieve the data every week or based on another frequency inputted by a system administrator. In another non-limiting example, the analytics server may retrieve the data each time a data table is updated or revised, such as each time new data is added to the database.

In yet another non-limiting example, the analytics server may retrieve the data upon receiving a request from a webserver, allowing the analytics server to detect PII in real time (e.g., a request from a webserver to identify whether data to be presented to a user includes any PII). The request may be generated and transmitted by the webserver hosting a website accessed by the user on their user device. For instance, a user may initiate a web browser application and access a website generated/hosted by webserver and request to view data that may or may not include PII. When the user requests to view the data, the webserver may transmit a request to the analytics server that includes an indication of the data requested by the user and an identifier of the user. The analytics server may in turn analyze the data and mask the PII.

The request received by the analytics server may include additional data associated with the user or the user device. For instance, the user may log in to the website provided by the webserver. As a result, the webserver may access the user's demographic data previously inputted by the user in a profile and/or retrieved from a third party. When transmitting the request to the analytics server, the webserver may include the user's data (e.g., access rights) and any other data included in the user's profile. The webserver may also include data associated with the user's device, such as an IP address, location data, a MAC address, and the like. In some embodiments, the request may include an identifier of the user, such that the analytics server can retrieve the user's profile. The analytics server may use the profile to determine whether the user can access PII (e.g., whether the user is authorized to view PII or retrieve a PII sensitivity authorization level from the user's profile).

At step 220, the analytics server may execute, using a vector comprising a numerical representation of the metadata, a first artificial intelligence model to generate a first score corresponding a first likelihood of the column including PII. In step 230, the analytics server may execute a second artificial intelligence model to generate a second score corresponding to a second likelihood of the column including PII, the second artificial intelligence model determining the second score based on a cardinality value or a length value of the identifier.

Figure 3:
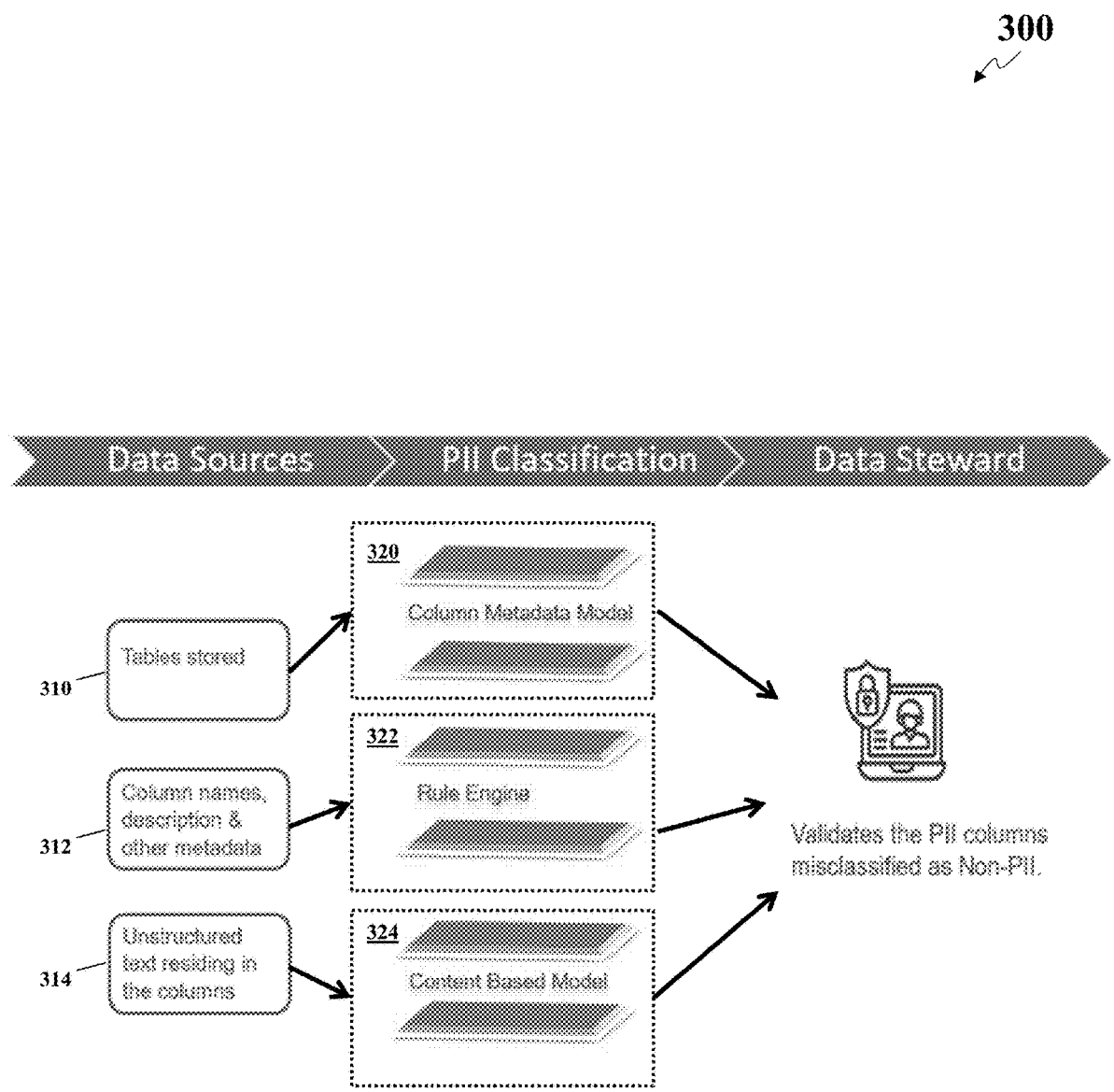

As depicted in FIG. 3, the analytics server may utilize three different AI models to identify PII. For instance, the analytics server may retrieve data tables stored within one or more databases (310). The analytics server may also retrieve column names, description, and other metadata associated with each column (312). The analytics server may also retrieve structured or unstructured text (or other data) that resides within the columns (314). The analytics server may then apply the retrieved data to three different models. For instance, the analytics server may utilize a column metadata model 320. The column metadata model 320 may be a probabilistic machine learning model that uses text encoding techniques to analyze column metadata.

The rules engine model 322 may be a rule and indicator-based learning model that finds patterns and exact matches of the PII data within the retrieved data. The content-based model 324 may analyze the retrieved data by performing pattern recognition in metadata and/or content of each column using natural language processing (NLP) techniques. During training, the analytics server may display the results (e.g., a likelihood of a column including PII) on a platform for a system administrator (also referred to herein as a data steward). The system administrator may view the results and determine whether the model's performance is accurate. The analytics server may monitor interactions of the system administrator and retrain and recalibrate the models accordingly. The data steward may be the only human reviewer of the PII sensitivity detection framework. Upon receiving confirmation from the data steward, the analytics server may designate the column as PII within the database by changing a data record within the database. The revision of the data record to PII prohibits webservers from displaying the data within the column to unauthorized users.

The three models depicted in FIG. 3 learn from patterns and content present within the data. When trained, each model is configured to generate a separate score indicating a likelihood of each column including PII. As will be described below, the analytics server may generate an overall score using one or more of the scores generated by one or more of the models.

Figure 4:
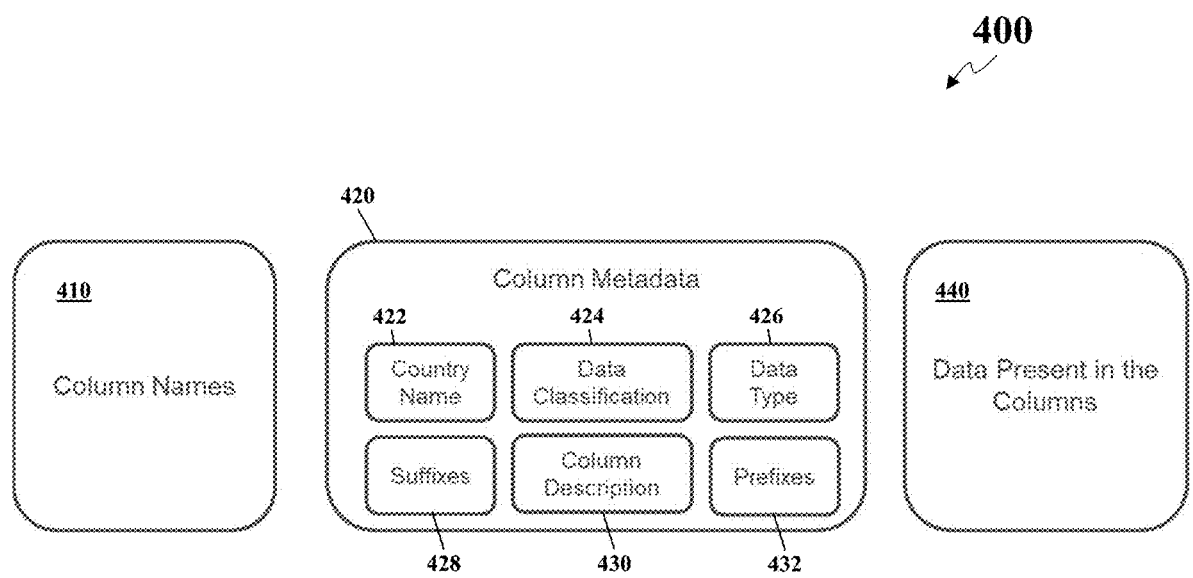

Referring to FIG. 4, a visual representation of data collected by the analytics server is depicted, in accordance with an embodiment. The analytics server may collect three categories of data including column names 410, column metadata 420 that may include country name 422, data classification 424, data type 426 (e.g., whether the data stored within the column is text-based or numerical), suffixes 428 (e.g., last three characters of the column name), column description 430 (e.g., a limited number of words that describe the column; these words may have been previously defined when generating the column or the data table), and prefixes 432 (e.g., the first three characters of the column name). The analytics server may also collect data present in the column 440, such as text included within the column.

Figure 5:
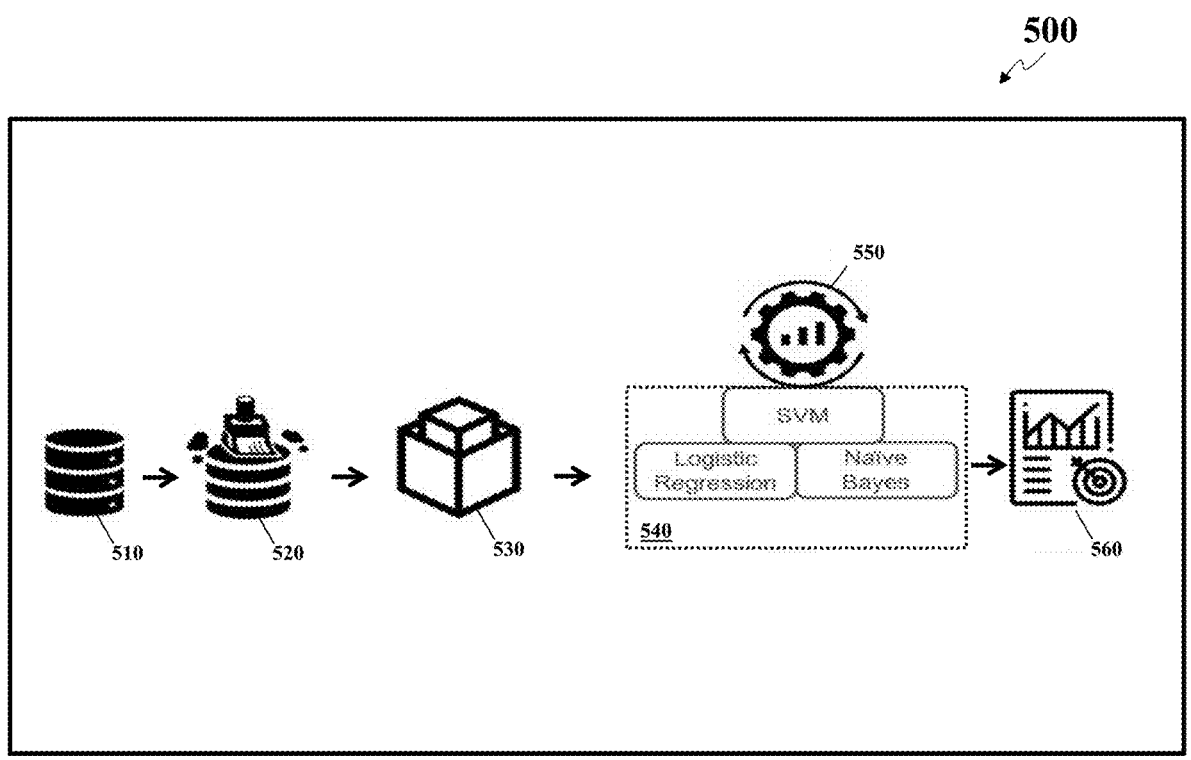

Referring to FIG. 5, the method 500 is a visual representation of training and utilizing the column metadata model (also referred to herein as the first model), in accordance with an embodiment. The analytics server may train the column metadata model, such that the model uses patterns within the metadata of a column to learn characteristics of a column that includes PII data. When trained, the column metadata model can ingest granular data, such as metadata associated with a column, to distinguish columns that include PII from columns that do not include PII.

The column metadata model may first retrieve metadata associated with different columns. In the data retrieval step 510, the analytics server may retrieve data consisting of data tables present in an organization database, such as an Enterprise Analytics Platform (EAP), a Hadoop based platform. From the tables present in the EAP, the analytics server may extract the column names and metadata such as long/short column descriptions, country name, classification type, and data type.

The data treatment step 520 may be a processing step that entails a thorough cleaning and processing of the raw data so that it can be used to train and be used by the column metadata model. In the data treatment step 520, the analytics server may remove duplicate column names, or remove null and empty column names and description. The analytics server may also tokenize and remove digits, special characters, and punctuations from the text present in column names and description.

In the text encoding step 530, the analytics server may process text data into number/vector representation of the data retrieved and treated from step 520. In some configurations, raw text may be indigestible to a machine (or an AI model) as an input until and unless, it's converted into a numerical format. Text encoding may also preserve the context and relationship between characters, words and sentences, such that a machine or AI model can understand the pattern associated with any text. The analytics server may use one or more of the following methods of text encoding:

One-Hot Encoding—One-Hot Encoding protocol may create additional features based on the number of unique values in the categorical feature.

Count Vectorization—Count Vectorization may be similar to one-hot encoding protocol, except count vectorization may be used for columns containing text data. The analytics server may use this protocol to generate vectors of dimensions equal to that of the vocabulary of the text corpus.

Term Frequency (TF)/Inverse Document Frequency (IDF)—This method generates a score that defines the importance of keyword in a text. The TF-IDF technique may convert text into a numerical vector, thereby, making it ready to be consumed by a machine learning model.

Word2Vec—The analytics server may use this method to create word embedding using two neural network methods: Skip Gram and Common Bag of Words. Word2vec may treat each word as an atomic entity and may generate a vector for each word.

FastText—The analytics server may use this method that vectorizes the data by treating each word as composed of character n-grams.

After one or more encoding approaches, the analytics server may convert the text data into a sparse matrix. All other non-text features which were one-hot encoded, may also be converted into sparse matrices. Together, the text columns and other features, may be combined using various methods. The analytics server may then transmit the vectorized data to the column metadata model.

At step 540, the analytics server may train the model using the vectorized data. The analytics server may use three probabilistic types of machine learning methods, such as Multinomial Naïve Bayes, Logistic Regression, and/or Support Vector Machine to train the column metadata model. The analytics server may optimize the column metadata model using hyper-parameter tuning and satisfying 10-fold cross validation. For the Logistic Regression method, the analytics server may optimize the model by looking across multiple values of the hyper-parameters (e.g., permutations of 'newton-cg', 'lbfgs', 'liblinear' solver values, 'l1', 'l2', 'elastic-net' penalty values, and 100, 10, 1, 0.1, and 0.01 C values can be used for finding the most optimum combination. Similarly, for SVM, permutations of 'poly', 'rbf', 'sigmoid' kernels, 'scale', 'auto' values of gamma, and 50, 10, 1, 0.1, 0.01 C values may be used for finding the best performing combination).

At step 550, the analytics server may retrain and recalibrate the model. The desired outcome of the trained model is the correct classification of the data into PII and Non-PII. Thus, true positive rate or recall can be used as the success metric that is used to measure the desired outcome. The analytics server may calculate this metric by dividing the total number of true positives (e.g., PIIs identified correctly as PIIs) by the sum of true positives and false negatives (e.g., PIIs identified as non-PIIs). A high recall signifies that the model is producing less false negatives, thus reducing the risk of tagging a PII data column as non-PII. The analytics server may display the results produced by the model to a data steward and receive a confirmation or denial of the results. Using the steward's assessment of the results, the analytics server may determine whether the model's classification is correct. After training the model, the model is now ready and configured to be used to analyze new data to predict a score for a column (step 560).

Figure 6:
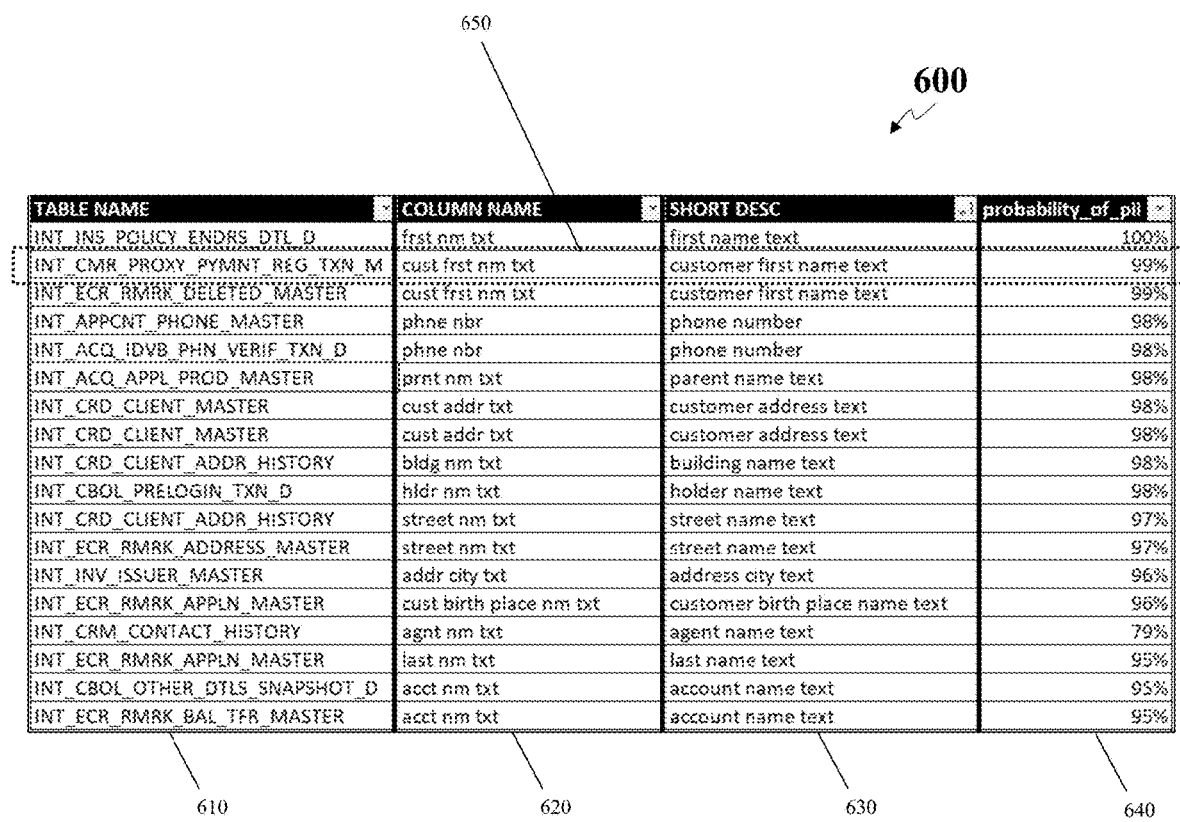

Referring to FIG. 6, the data table 600 depicts a data table with different columns and rows, in accordance with an embodiment. The data table 600 may include columns 610-640. The data table 600 may represent data that is tagged as including PII using the column metadata model. The analytics server may execute the column metadata model to calculate a score for each column within each table. For instance, row 650 may display a table name (column 610), column name (column 620), short description of the column (column 630), and a score that indicates that the column includes PII (column 640). In some configurations, the analytics server may display the data tables 600 for the data steward to receive a confirmation of the predicted scores. For instance, the data steward may manually review the columns indicated as having a high likelihood of including PII. The data steward may then designate the column as PII or non-PII.

In some embodiments, the same data may be stored in data tables that arrange the data differently. For instance, referring to FIG. 7, the data table 700 depicts a data table with different columns and rows, in accordance with an embodiment. The data table 700 may include columns 710-730. As depicted, data tables 600, 700 use different formats and include different data. This difference may be due to local regulations. For instance, in the non-limiting example, the data stored within both data tables may be financial data. However, different regions/countries may dictate how financial data must be stored within different data tables. While different formatting and storage of data may impede conventional systems from producing reliable results, the methods and systems described herein allow the analytics server to analyze data stored within different columns in a way that is arrangement-agnostic. Therefore, the analytics server can train the column metadata model based on the available data within (e.g., how data is arranged or what metadata is available), such that the column metadata model is trained to identify PII accordingly.

Figure 8:
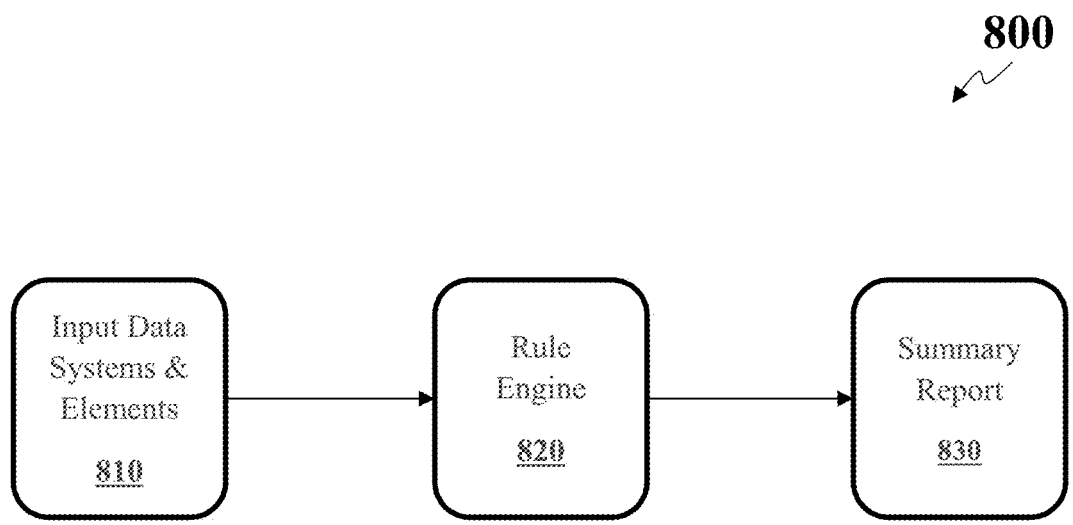
FIGS. 8-9 illustrate flowcharts depicting operational steps for a PII sensitivity detection framework, in accordance with an embodiment.

Referring to FIG. 8, a visual representation of the rules engine model (also referred to herein as the second model). The second model may use various predefined rules to determine whether a column included PII. The flow chart 800 illustrates how the second model can be utilized to generate/predict a second score indicative of a column including PII.

At step 810, the analytics server may transmit a false positive column training dataset (e.g., columns predicted as PII by the metadata column model that were originally tagged as non-PII) to the rules engine model. At step 820, the rules engine model may then use various modeling and machine learning techniques to train itself to recognize one or more patterns and rules among the training dataset.

Figure 9:
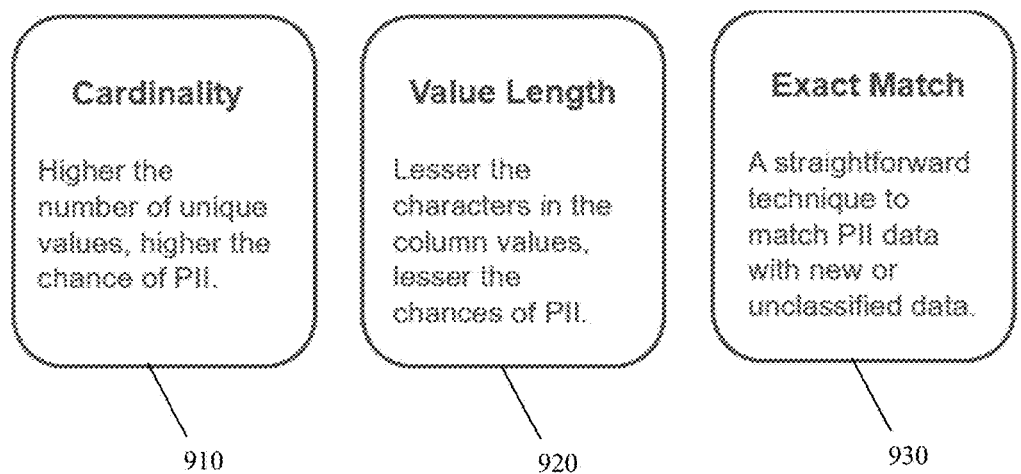

The analytics server may initially define three rules for the rules engine model, as depicted in FIG. 9. The rules and indicators 900 may be derived from observations of the training dataset and/or derived from initial hypothesis inputted by system administrators. That is, the analytics server may define various rules for the rules engine model and the rules engine model may train itself accordingly to determine whether the dataset includes one or more patterns verifying the inputted rules.

Non-limiting examples of the rules may include a cardinality rule 910 that indicates the higher the number of unique values, the higher the chance for PII presence. For instance, the cardinality rule 910 indicates that if there are higher number of unique values in a column, there is a higher possibility of the column including PII. In another non-limiting example, a value length rule 920 indicates that the lesser the characters in the column value, the lesser the chance of PII being present within the column. For instance, the value length rule indicates that if the values in a column has 3 characters (or fewer), the column has a low probability of being a PII.

In another non-limiting example, an exact match rule 930 requires the rules engine model to match PII data with new or unclassified data within the training dataset. Under this rule, the model may compare the exact PII data with the columns being scanned to evaluate their score that indicates a likelihood of the column including PII. In a non-limiting example, the rules engine model may evaluate a subset of users (e.g., 10 users who have the most card accounts). The model may then extract the data from a set of PII columns containing the data of those 10 users evaluated in the first step. The extracted data may not be stored within the database (e.g., in the disk) due to its sensitive nature, rather it's stored in-memory. The model may then compare the PII data extracted with every value of the columns whose PII sensitivity is being evaluated. With every match, a counter is increased and the model may utilize the counter to determine a likelihood of the column including PII. The model may repeat this process to determine a likelihood of the column including PII.

Referring back to FIG. 8, at step 830, the analytics server may train the rules engine model and execute the rules engine model to generate a summary report including the second score. The rules engine model may apply the rules to eliminate the true non-PII column from PII columns. Executing the rules engine model in conjunction with the column metadata model increases the analytics server's confidence in PII identification by reducing uncertainty in PII identification.

Referring to FIG. 10, an example of the second score used in conjunction with the first score is depicted, in accordance with an embodiment. As depicted, a chart 1000 includes column 1010 that displays table names, column 1020 that displays original column name, column 1030 that displays short description, column 1040 that displays the results of executing the column metadata model, and column 1050 that displays the results of executing the rules engine model.

As depicted, certain columns may not include enough metadata for the first model to calculate accurate results. For instance, row 1060 indicates that the column storing old card numbers does not include enough metadata for the column metadata model to indicate a very high likelihood of PII. However, when the rules engine model analyzes the column name and short description, the rules engine model indicates a 100% likelihood that this column includes PII. This highly confident score is generated using the cardinality rule, which advocates that higher number of unique values in a column translates to a high number of possibility of PII existence. In another example, row 1070 indicates that the payment transfer text column has a name and description that does not indicate PII (79% chance of PII). However, metadata associated with the column indicates a very high chance of including PII (90%).

Referring to FIG. 11, an example of the second score used in conjunction with the first score is depicted, in accordance with an embodiment. As depicted, chart 1100 includes column 1110 that displays table names, column 1120 that displays original column name, column 1130 that displays short description, columns 1140-1160 that display results of executing the rules engine model. The chart 1100 is generated by applying the column value length rule 920 advocating that a column (string type) that has values of max 1, 2, or 3 characters have a low probability of being or including PII (usually those columns contain indicators or IDs). As used herein, the characters evaluated refer to characters of the actual data stored within the column. For instance, birth city code may be a single number (1 character). However, nationality description may be two words or two characters. As depicted, the row 1180 illustrates a column with 2 characters and the row 1170 illustrates a column with 1 character length. When applying the column value length rule 920, the analytics server (rules engine model) generates a higher score for the column illustrated in row 1180.

In another example, as depicted in the chart 1101, row 1190 and row 1192 indicate only 1 max character length and thus have far lower chances of being PII whereas other rows within the chart 1101 have much higher chances of being PII attributed to the high number of max character length.

Referring to FIG. 12, an example of the second score used in conjunction with the first score is depicted, in accordance with an embodiment. As depicted, a chart 1200 includes column 1210 that displays table names, column 1220 that displays original column name, column 1230 that displays short description, column 1240 that displays the results of executing the column metadata model, and column 1250 that displays results of executing the rules engine model. The chart 1200 is generated by applying the column value match in which the analytics server compares the known PII data with the columns to evaluate the latter's chance of including PII. As depicted, the column illustrated in row 1260 has a low likelihood of including PII (55%) when evaluated using the column metadata model. However, using the rules engine model, the analytics server may identify 33 instances of values that matched with PII values. Therefore, the column illustrated in row 1260 probably includes PII. In contrast, as depicted in row 1270, the results generated by the column metadata model may be consistent with the results generated by the rules engine model.

The analytics server may also train and execute a third AI model to generate another score indicative of a column including PII. While the first two models analyze column-specific data, the third model may analyze the data stored within the column to recognize PII when encountered. The third model may not only identify PII based on the content of the words or sentences (e.g., recognize that a set of numbers is a user's social security number), it will also recognize patterns based on preceding and/or proceeding characters (e.g., words or alphanumerical characters). The third model may also execute these NLP protocols on column name and description. Therefore, the methods discussed herein are not limited to column content.

Figure 13:
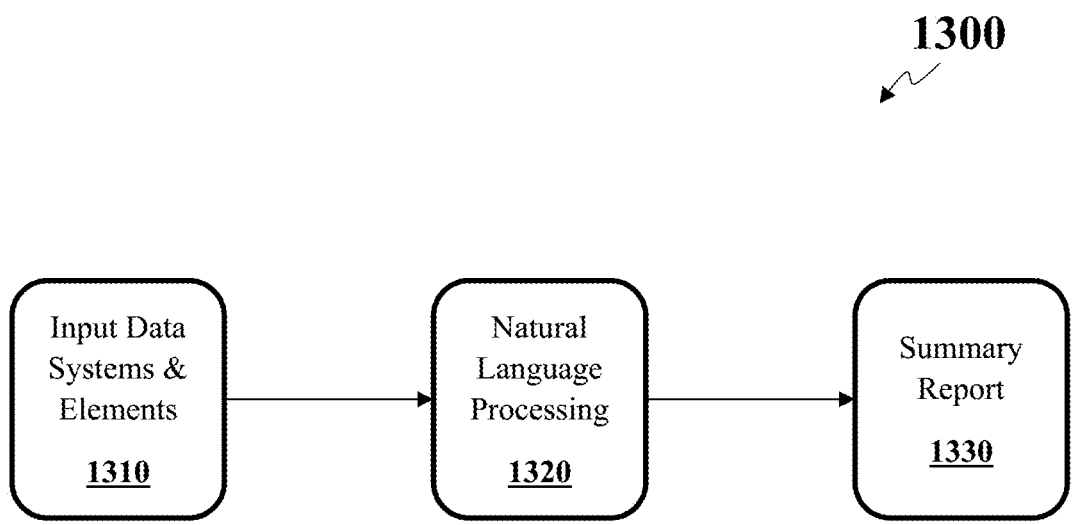
FIGS. 13-14 illustrate flowcharts depicting operational steps for a PII sensitivity detection framework, in accordance with an embodiment.

Referring to FIG. 13, a visual representation of the content-based model (also referred to herein as the third model). The third model may use various NLP protocols to determine whether a column includes PII. The flow chart 1300 illustrates how the third model can be utilized to generate another score indicative of a column including PII.

At step 1310, the analytics server may generate a training dataset consisting of false positive columns dataset (e.g., columns predicted as PII by the first model that were originally tagged as non-PII). Additionally or alternatively, the training dataset may include false positive columns generated by the rule engine model, which were identified as non-PII by the column metadata model and/or a system administrator.

Figure 14:
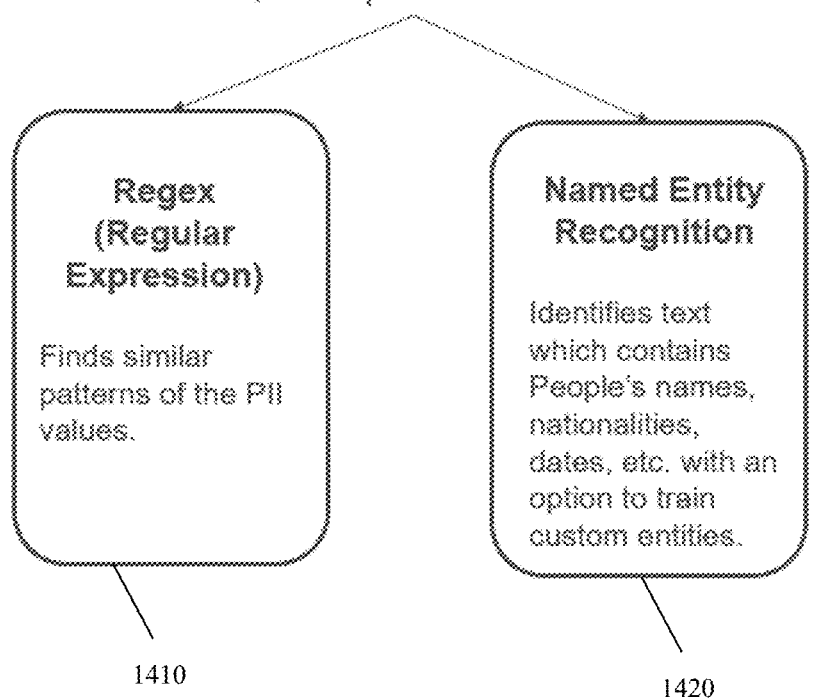

At step 1320 the analytics server may train the content-based model to recognize PII using various rules and methods, depicted in FIG. 14. As depicted, the analytics server may use two different NLP techniques. The first technique 1410 may include utilizing a Regular Expression (regex). A regex is defined by a sequence of characters that specifies a search pattern. The analytics server may create regex patterns that could match email addresses, credit card numbers, dates, addresses, city, and people names. The regex is then used by the content-based model to search for similar patterns in the data present within the columns. When a match is found in a column (e.g., from the false positive list), it increases the probability of PII for that column.

A second technique 1420 may utilize a named entity recognition protocol. This technique allows identification of entities in a text and classifies them into predefined categories. The entities can be names of people, organization, locations, monetary values, etc. To improve the results, the analytics server may train customized entities, which are specific to an organization (e.g., a bank). The named entity recognition technique may add value to the PII detection capability by the content-based model. Specifically, the names entity recognition protocol may provide scalability. Moreover, the named entity recognition protocol may analyze ambiguous language and identify PII. Ambiguous entities in text may be difficult to capture from regex. For example, June is a name of a month and could be a person's name as well. Similarly, Carter could be someone's first name as well as last name. With several such possibilities, it's easy to misclassify or overlook entities that might be PII using conventional systems. In contrast, the content-based model may classify text into multiple entities in case of ambiguity, thereby allowing the analytics server to classify the column as PII if any one of those entities indicate the text to be PII.

Referring back to FIG. 13, at step 1330, the analytics server may provide a summary report for the user. The analytics server may execute the content-based model and generate another score for one or more columns. Non-limiting examples of scores are depicted in FIG. 15 where chart 1500 illustrates an example of the score generated based on execution of the content-based model. As depicted, chart 1500 includes column 1510 that displays table names, column 1520 that displays column name, column 1530 that displays short description for each column, column 1540 that displays the results of executing the content-based model, and column 1550 that displays entities identified by the content-based model. Specifically, the entities identified by the content-based model are the reason that the content-based model calculates the score identified in column 1540. For instance, as depicted in row 1560, the employer state text column has a 98% percent chance of including PII because the content-based model has identified a text pattern that matches string of city names, which has been designated as PII.

Referring back to FIG. 2, at step 240, the analytics server may generate a third score based on the first and the second scores. The analytics server may generate the third score by averaging the first and second scores generated by the first two AI models. In embodiments where the analytics server executes all three models, the analytics server may also account for the third AI model. Additionally or alternatively, the analytics server may use a weighted average. For instance, the analytics server may assign a higher weight to the first AI model, over the second AI model, or the third AI model.

At step 250, the analytics server may, in response to determining that the third score indicates that the column includes PII, mask the column data. The analytics server may directly display or instruct the webserver to display a graphical element that masks the identified PII. The graphical element may be any element that does not allow the user to view the PII. The graphical element may be an overlay that covers and redacts the PII. For instance, the graphical element may be a colored box that does not allow the user to view the PII.

In another example, the analytics server may instruct the webserver to stop the display of the PII to the user. The analytics server may instruct the webserver to display one or more graphical elements within the webpage. These visual elements may inform the user that the user is not authorized to view the data because the data includes PII. The analytics server may display (or instruct the webserver to display) the graphical elements in accordance with predetermined and revisable visual characteristics. These visual characteristics may allow the analytics server to match the visual characteristics of other components within the webpage. For instance, the new interactive graphical element may match the same size, font, color, and other visual characteristics of other components displayed by the webserver.

The analytics server may instruct the webserver to embed code configured to display the graphical elements within the website generated/hosted by the webserver. In a non-limiting example, the analytics server may access software scripts (e.g., HTML code) associated with the website and may reconfigure the scripts, such that the newly generated graphical elements are embedded within the website. Additionally or alternatively, the analytics server may display the results (e.g., any of the scores generated by any of the models discussed herein) on a dashboard, as depicted in FIGS. 6, 7, 10-12, and 15.

Figure 16:
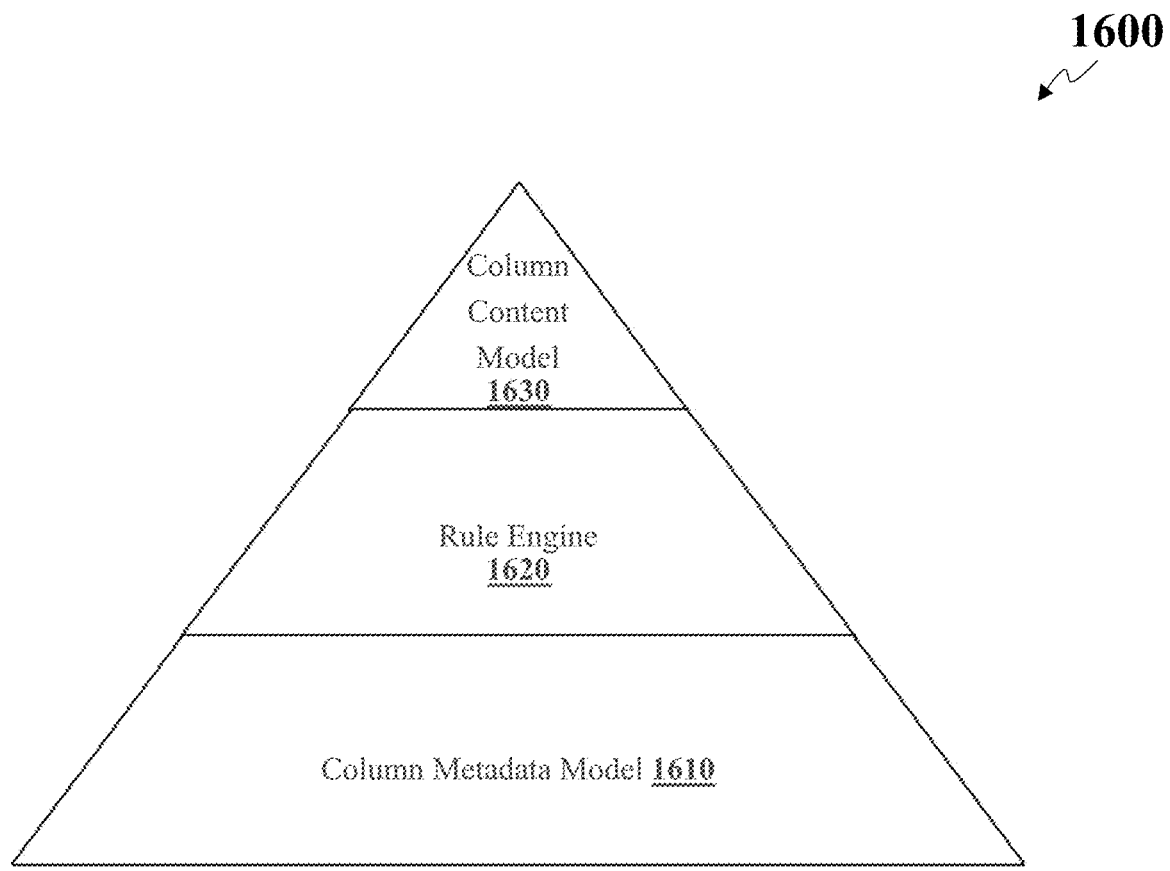
FIG. 16 illustrates different layers of a PII sensitivity detection framework, in accordance with an embodiment.

In an example, referring to FIG. 16, the analytics server may analyze data using a PII detection framework 1600 that includes three layers. Each layer may indicate a model discussed herein. The analytics server may execute any combination of the layers discussed herein. Each layer, in silo, is capable of detecting PII. However, when executed in conjunction with other layers, they form a formidable framework that is capable of detecting PII and minimizing uncertainty by other layers. The framework 1600 is entity/organization agnostic and can be applied to any organization or type of data. For instance, the framework 1600 may be trained for different organizations, languages, and/or countries, such that the results are customized.

In operation, the analytics server may first execute the column metadata model 1610 (first layer) and generate a first score indicative of PII existence within a column. The first layer may provide a high number of columns with potential PII (e.g., highest among the layers). This high number of columns may include false positive results. As a result, the analytics server may execute the second layer (rules engine 1620). The analytics server may only analyze columns that have a score beyond a threshold (e.g., the column metadata model 1610 generated a score that is more than 75%).

In another example, the analytics server may only execute the second layer using a dataset that includes columns that are identified as PII by the column metadata model 1610 but were previously designated as non-PII (e.g., false positives or potential false positives). Using the second layer, the analytics server may reduce the number of false positives. Similarly, the analytics server may execute a third layer using a column content model 1630 that includes the false positives generated via execution of the first and/or the second layers.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, function, procedure, subroutine, subprogram, or the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that is accessible by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. "Disk" and "disc," as used herein, include compact disc (CD), laser disc, optical disc, digital versatile disc (DVD), floppy disk, and Blu-ray disc formats, wherein "disks" reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory, processor-readable medium and/or computer-readable medium, which may be incorporated into a computer program.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A method comprising:
    executing, by a processor, a first artificial intelligence model to generate a first score corresponding a first likelihood of a set of text including personally identifiable information;
    executing, by the processor, a second artificial intelligence model to generate a second score corresponding to a second likelihood of the set of text including personally identifiable information, the second artificial intelligence model determining the second score based on a cardinality value or a length value associated with the set of text; and
    masking, by the processor, at least a portion of the set of text likely to include personally identifiable information in accordance with the first score and the second score.

2. The method of claim 1, wherein the first artificial intelligence model uses metadata associated with the set of text to determine the first likelihood.

3. The method of claim 1, wherein masking at least the portion of the set of text corresponds to:
    instructing, by the processor, a webserver to redact at least the portion of the set of text.

4. The method of claim 1, wherein the first artificial intelligence model is configured to ingest a vector associated with the set of text to predict the first score, wherein the vector is generated using at least one of one-hot encoding, count vectorization, or term frequency method.

5. The method of claim 1, further comprising:
executing, by the processor, a third artificial intelligence model to generate a fourth score corresponding to a fourth likelihood of the set of text including personally identifiable information, the third artificial intelligence model determining the fourth score based on executing a natural language processing protocol.

6. The method of claim 1, wherein the first artificial intelligence model uses metadata associated with the set of text to generate the first score, wherein the metadata corresponds to at least one of a geographical region, a classification, a data type, a defined number of characters for at least one data record, or a description associated with the set of text.

7. The method of claim 1, wherein the processor masks at least the portion of the set of text when a user viewing at least the portion of the text has a user attribute that satisfies a threshold.

8. The method of claim 1, wherein masking at least the portion of the set of text corresponds to revising, by the processor, a data record that corresponds to at least the portion of the set of text.

9. A system comprising:
a server comprising a processor and a non-transitory computer-readable medium containing instructions that when executed by the processor causes the processor to perform operations comprising:
execute a first artificial intelligence model to generate a first score corresponding a first likelihood of a set of text including personally identifiable information;
execute a second artificial intelligence model to generate a second score corresponding to a second likelihood of the set of text including personally identifiable information, the second artificial intelligence model determining the second score based on a cardinality value or a length value associated with the set of text;
mask at least a portion of the set of text likely to include personally identifiable information in accordance with the first score and the second score.

10. The system of claim 9, wherein the first artificial intelligence model uses metadata associated with the set of text to determine the first likelihood.

11. The system of claim 9, wherein masking at least the portion of the set of text corresponds to instructing a webserver to redact at least the portion of the set of text.

12. The system of claim 9, wherein the first artificial intelligence model is configured to ingest a vector associated with the set of text to predict the first score, wherein the vector is generated using at least one of one-hot encoding, count vectorization, or term frequency method.

13. The system of claim 9, wherein the instructions further cause the processor to:
execute a third artificial intelligence model to generate a fourth score corresponding to a fourth likelihood of the set of text including personally identifiable information, the third artificial intelligence model determining the fourth score based on executing a natural language processing protocol.

14. The system of claim 9, wherein the first artificial intelligence model uses metadata associated with the set of text to generate the first score, wherein the metadata corresponds to at least one of a geographical region, a classification, a data type, a defined number of characters for at least one data record, or a description associated with the set of text.

15. The system of claim 9, wherein the processor masks at least the portion of the set of text when a user viewing at least the portion of the text has a user attribute that satisfies a threshold.

16. The system of claim 9, wherein masking at least the portion of the set of text corresponds to revising, by the processor, a data record that corresponds to at least the portion of the set of text.

17. A system comprising:
a first artificial intelligence model;
a second artificial intelligence model;
a server having at least one processor in communication with the first artificial intelligence model and the second artificial intelligence model, the server configured to:
execute the first artificial intelligence model to generate a first score corresponding a first likelihood of a set of text including personally identifiable information;
execute the second artificial intelligence model to generate a second score corresponding to a second likelihood of the set of text including personally identifiable information, the second artificial intelligence model determining the second score based on a cardinality value or a length value associated with the set of text;
mask at least a portion of the set of text likely to include personally identifiable information in accordance with the first score and the second score.

18. The system of claim 17, wherein the first artificial intelligence model uses metadata associated with the set of text to determine the first likelihood.

19. The system of claim 17, wherein masking at least the portion of the set of text corresponds to instructing a webserver to redact at least the portion of the set of text.

20. The system of claim 17, wherein the first artificial intelligence model is configured to ingest a vector associated with the set of text to predict the first score, wherein the vector is generated using at least one of one-hot encoding, count vectorization, or term frequency method.

* * * * *